(12) United States Patent
Ni et al.

(10) Patent No.: US 11,365,818 B2
(45) Date of Patent: Jun. 21, 2022

(54) SHOWER CONTROL VALVE WITH REASONABLE ARRANGEMENT

(71) Applicant: XIAMEN DELMEI SANITARY WARE CO., LTD., Xiamen (CN)

(72) Inventors: Changzheng Ni, Xiamen (CN); Jingyun Wu, Xiamen (CN); Yongqiang Yan, Xiamen (CN)

(73) Assignee: XIAMEN DELMEI SANITARY WARE CO., LTD., Xiamen (CN)

( * ) Notice: Subject to any disclaimer, the term of this patent is extended or adjusted under 35 U.S.C. 154(b) by 9 days.

(21) Appl. No.: 17/038,678

(22) Filed: Sep. 30, 2020

(65) Prior Publication Data
US 2022/0057003 A1 Feb. 24, 2022

(30) Foreign Application Priority Data

Aug. 20, 2020 (CN) .......................... 202021743858.4

(51) Int. Cl.
*F16K 11/078* (2006.01)
*B05B 1/30* (2006.01)
*E03C 1/06* (2006.01)

(52) U.S. Cl.
CPC .............. *F16K 11/078* (2013.01); *B05B 1/30* (2013.01); *E03C 1/06* (2013.01)

(58) Field of Classification Search
CPC ............. F16K 11/078; B05B 1/30; E02C 1/06
See application file for complete search history.

(56) References Cited

U.S. PATENT DOCUMENTS

| 4,964,573 | A | * | 10/1990 | Lipski | ....................... E03C 1/06 239/283 |
| 5,481,765 | A | * | 1/1996 | Wang | ....................... A47K 3/28 4/567 |
| 10,322,058 | B1 | * | 6/2019 | Patch | ....................... B05B 1/00 |
| 11,028,564 | B2 | * | 6/2021 | Ball | ........................ E03C 1/06 |
| 2007/0209106 | A1 | * | 9/2007 | Comenos | ............... E03C 1/042 4/570 |
| 2013/0340854 | A1 | * | 12/2013 | Quinn | .................. B05B 1/3026 137/343 |
| 2015/0354192 | A1 | * | 12/2015 | Hauth | ................... F16K 31/385 4/448 |
| 2017/0167121 | A1 | * | 6/2017 | Lin | ........................ B05B 15/65 |
| 2018/0104707 | A1 | * | 4/2018 | Lin | ........................... E03C 1/06 |

* cited by examiner

Primary Examiner — Kevin R Barss
(74) Attorney, Agent, or Firm — Bayramoglu Law Offices LLC

(57) ABSTRACT

A shower control valve with a reasonable arrangement includes a main body, a control member and a holding member. The main body includes a water inlet channel and a water outlet channel. The control member is movably arranged at one end of the main body and used to control on-off between the water inlet channel and the water outlet channel. The holding member includes a connecting part fixedly connected to the other end of the main body, and a hooking part for hooking a shower head. The connecting part and the hooking part are staggered along the radial direction of the main body to form a give-way space, which prevents interference with other parts during the plugging and unplugging process of the shower, and provides a simple structure and strong practicability.

18 Claims, 3 Drawing Sheets

SHOWER CONTROL VALVE WITH REASONABLE ARRANGEMENT

CROSS REFERENCE TO THE RELATED APPLICATIONS

This application is based upon and claims priority to Chinese Patent Application No. 202021743858.4, filed on Aug. 20, 2020, the entire contents of which are incorporated herein by reference.

TECHNICAL FIELD

The present invention relates to the field of sanitary fittings, in particular to a shower control valve with a reasonable arrangement.

BACKGROUND

The traditional American three-way structure is a straight-type holding structure, which is likely to cause interference during plugging and unplugging the shower head, or during the installation of a relatively large rain shower head, the handheld shower head and the rain shower head will interfere with each other, which impedes the use of the large rain shower head and the large handheld shower head.

SUMMARY

In order to address at least one of the above-mentioned technical problems, the present invention provides a shower control valve with a reasonable arrangement. In the shower control valve, the connecting part and the hooking part are staggered along the radial direction of the main body, thereby forming a give-way space that prevents interference with other parts when plugging or unplugging the shower head. The shower control valve has a simple structure and good practicability.

In order to achieve the above objective, the technical solutions adopted by the present invention are as follows.

A shower control valve with a reasonable arrangement, including:

a main body having a water inlet channel and a water outlet channel;

a control member movably attached to one end of the main body used to control the on-off of the water flow between the water inlet channel and the water outlet channel;

a holding member including a connecting part fixedly connected to the other end of the main body, and a hooking part for hooking a shower head.

The connecting part and the hooking part are staggered along a radial direction of the main body.

Preferably, the holding member further includes a connecting arm extending in the radial direction of the main body. The connecting part is provided at an upper end of the connecting arm. The hooking part is arranged at a lower end of the connecting arm. The holding member forms a "Z"-shaped structure.

Preferably, a clamping structure is provided between the connecting part and the main body. The connecting part and the main body are connected and then limited along an axial direction of the main body by the clamping structure. The connecting part can rotate relative to a circumferential direction of the main body.

Preferably, the clamping structure includes an inserting shaft fixedly arranged on the main body, and a sleeve fixedly installed on the connecting part. The inserting shaft is inserted and connected to the sleeve.

Preferably, the inserting shaft is provided with a clamping part, and the sleeve is provided with a position-limiting member. The clamping part and the position-limiting member are limited in the axial direction and rotate in the circumferential direction.

Preferably, the shower control valve further includes a ring chuck that is in position-limiting fit with the sleeve in a circumferential direction. A side of the ring chuck opposite to the main body is provided with a plurality of clamping teeth along the circumferential direction, the ring chuck is provided with a central hole sleeved and fitted with the inserting shaft, the inserting shaft passes through the central hole and is clamped with the position-limiting member of the sleeve, and then the ring chuck is pressed tightly against the main body.

Preferably, the sleeve is fixed on the connecting part by a fastener.

Preferably, the holding member is an integrally formed structure, or the holding member includes an insert block and an outer shell, the insert block and the outer shell are formed by secondary rubberization.

Preferably, the water outlet channel includes a shower channel and a rain shower channel, and the control member includes a switching member that controls the water inlet channel to switch communication with the shower channel and the rain shower channel.

Preferably, the control member includes a knob rotatably arranged at one end of the main body.

The advantages of the present invention are as follows.

1. The shower control valve with the reasonable arrangement includes the main body, the control member, and the holding member. The main body has the water inlet channel and the water outlet channel. The control member movably is arranged at one end of the main body and used to control the on-off between the water inlet channel and the water outlet channel. The holding member includes the connecting part fixedly connected to the other end of the main body, and the hooking part for hooking the shower head. The connecting part and the hooking part are staggered along the radial direction of the main body. The connecting part and the hooking part are staggered along the radial direction of the main body, thereby forming a give-way space, and preventing interference with other parts during the plugging and unplugging process of the shower head. The shower control valve has a simple structure and good practicability;

2. The clamping structure is provided between the connecting part and the main body. The connecting part and the main body are connected and then limited along the axial direction of the main body by the clamping structure. The connecting part can rotate relative to a circumferential direction of the main body, such that the angle of the holding member is adjustable and the use is more flexible;

3. The shower control valve further includes the ring chuck in position-limiting fit with the sleeve in the circumferential direction, and a side of the ring chuck opposite to the main body is provided with the plurality of clamping teeth along the circumferential direction. The ring chuck is provided with the central hole sleeved and fitted with the inserting shaft, such that the inserting shaft passes through the central hole and is clamped with the position-limiting member of the sleeve, and then the ring chuck is pressed tightly against the main body. During the adjustment process of the holding member, the ring chuck cooperates with the clamping teeth of the main body to form a sense of engaging a gear, thereby having a good operating feel and being less likely to slip;

4. The holding member is an integrally formed structure, or the holding member includes an insert block and an outer shell, and the insert block and the outer shell are formed by secondary rubberization. In this way, the shower control valve has good integrity, thereby facilitating assembly, and improving production efficiency.

BRIEF DESCRIPTION OF THE DRAWINGS

For a further understanding of the present invention, the drawings are described here and constitute a part of the present invention. The illustrative embodiments of the present invention and the description thereof are used to explain the present invention and do not constitute an improper limitation to the present invention. In the drawings.

DETAILED DESCRIPTION OF THE EMBODIMENTS

In order to make the technical problems, technical solutions and beneficial effects to be solved by the present invention clear and intelligible, the present invention will be further described in detail below with reference to the drawings and embodiments. It should be understood that the specific embodiments described here are only used to explain the present invention, and are not used to limit the present invention.

Figure 1:
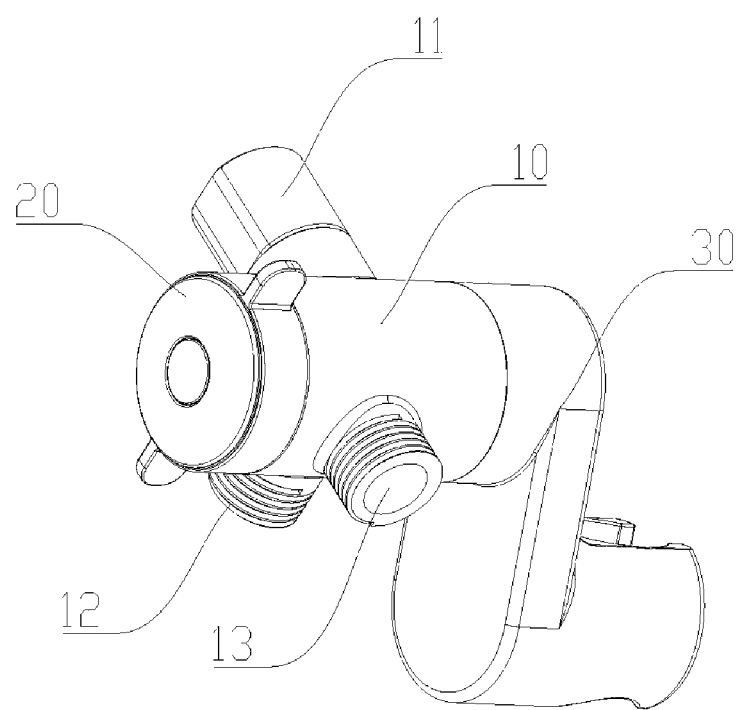
FIG. 1 is a perspective view of a shower control valve with a reasonable arrangement of the present invention.
Figure 2:
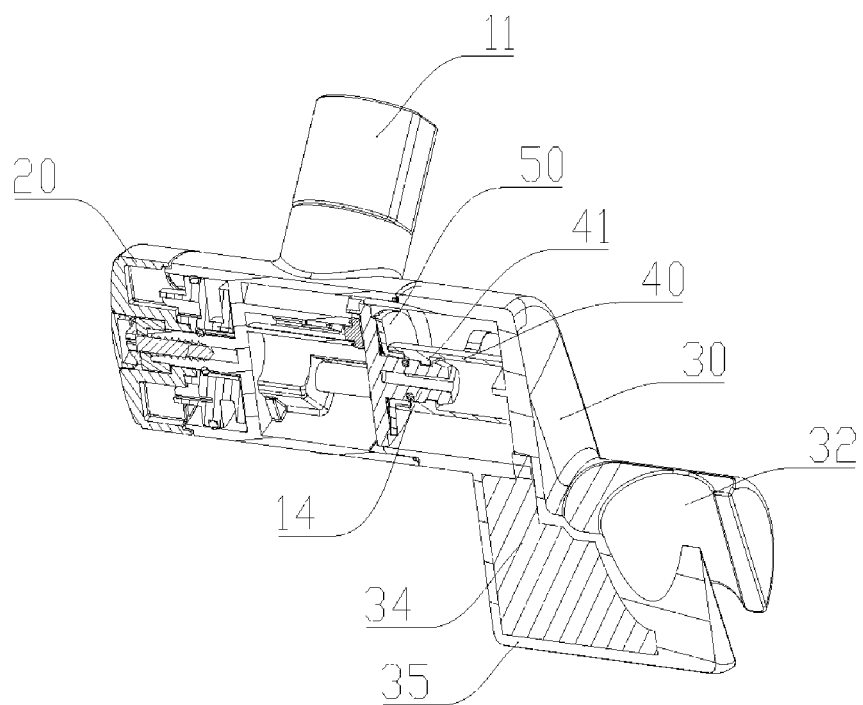
FIG. 2 is a cross-sectional view of a shower control valve with a reasonable arrangement of the present invention.
Figure 3:
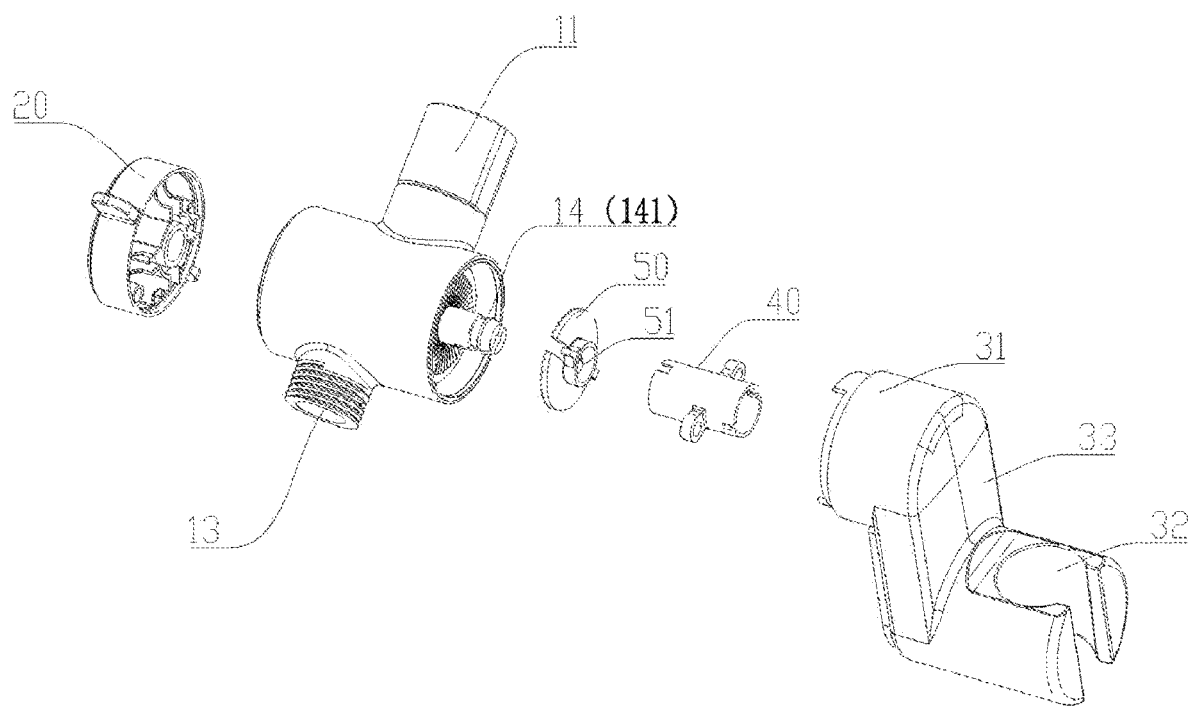
FIG. 3 is an exploded view of a shower control valve with a reasonable arrangement of the present invention.

As shown in FIGS. 1 to 3, a shower control valve with a reasonable arrangement includes a main body 10, a control member 20 and a holding member 30.

The main body 10 has a water inlet channel 11 and a water outlet channel.

A control member 20 is movably arranged at one end of the main body 10 and used to control the on-off between the water inlet channel 11 and the water outlet channel.

The holding member 30 includes a connecting part 31 fixedly connected to the other end of the main body 10 and a hooking part 32 for hooking a shower head.

The connecting part 31 and the hooking part 32 are staggered along the radial direction of the main body 10.

In the embodiment, the holding member 30 further includes a connecting arm 33 extending along the radial direction of the main body 10. The connecting part 31 is arranged at an upper end of the connecting arm 33, and the hooking part 32 is arranged at a lower end of the connecting arm 33, such that the holding member 30 forms a "Z"-shaped structure.

In the embodiment, a clamping structure is provided between the connecting part 31 and the main body 10. The connecting part 31 and the main body 10 are connected and then limited along the axial direction of the main body 10 by the clamping structure. In addition, the connecting part 31 can rotate relative to a circumferential direction of the main body 10, so that an angle of the holding member 30 is adjustable, making it more flexible to use.

In the embodiment, the clamping structure includes an inserting shaft 14 fixedly arranged on the main body 10, and a sleeve 40 fixedly arranged on the connecting part 31. The inserting shaft 14 is inserted and connected to the sleeve 40.

In the embodiment, the inserting shaft 14 is provided with a clamping part 141. The sleeve 40 is provided with a position-limiting member 41. The clamping part 141 and the position-limiting member 41 are limited in the axial direction and rotate in a circumferential direction. Specifically, the inserting shaft 14 is an elastic pin, the clamping part 141 is an annular clamping groove provided on an outer periphery of the elastic pin, and the position-limiting member 41 is an annular clamping rib provided on an inner wall of the sleeve 40.

In the embodiment, the shower control valve also includes a ring chuck 50 that is in position-limiting fit with the sleeve 40 in the circumferential direction. The side of the ring chuck 50 opposite to the main body 10 is provided with a plurality of teeth along the circumferential direction. The ring chuck 50 is provided with a central hole 51 that is sleeved and matched with the inserting shaft 14. The inserting shaft 14 passes through the central hole 51 and is clamped with the position-limiting member 41 of the sleeve 40, thereby pressing the ring chuck 50 tightly against the main body 10. During the adjustment process of the holding member 30, the ring chuck 50 cooperates with the teeth of the body to form a sense of engaging a gear, thereby having a good operating feel and being not easy to slip.

In the embodiment, the sleeve 40 is fixed on the connecting part 31 by a fastener 60, specifically, the fastener 60 is a screw.

In the embodiment, the holding member 30 is an integrally formed structure, alternatively, the holding member 30 includes an insert block 34 and an outer shell 35, and the insert block 34 and the outer shell 35 are formed by secondary rubberization, so that the product has good integrity, thereby facilitating assembly, and improving production efficiency.

In the embodiment, the water outlet channel includes a shower channel 12 and a rain shower channel 13, the control member 20 includes a switching member, and the switching member controls the water inlet channel 11 to switch communication with the shower channel 12 and the rain shower channel 13.

In the embodiment, the control member 20 includes a knob that is rotatably arranged at one end of the main body 10.

In the solution, the connecting part 31 and the hooking part 32 are staggered along the radial direction of the main body 10, thereby forming a give-way space, preventing interference with other parts during the plugging and unplugging process of the shower, and having a simple structure and strong practicability.

The above description shows and describes the preferred embodiments of the present invention, as mentioned above, it should be understood that the present invention is not limited to the form disclosed herein, and it should not be regarded as an exclusion of other embodiments, but can be used in various other combinations, modifications and environments, and can be modified through the above teachings or technology or knowledge in related fields within the scope of the present invention concept described herein. The modifications and changes made by those skilled in the art do not depart from the spirit and scope of the present invention, and should fall within the protection scope of the attached claims of the present invention.

What is claimed is:

1. A shower control valve with a reasonable arrangement, comprising a main body, a control member and a holding member, wherein the main body comprises a water inlet channel and a water outlet channel;

the control member is movably arranged at a first end of the main body and used to control an on-off of a water flow between the water inlet channel and the water outlet channel;

the holding member comprises a connecting part fixedly connected to a second end of the main body, and a hooking part for hooking a shower head;

wherein, the connecting part and the hooking part are staggered along a radial direction of the main body; and the holding member further comprises a connecting arm, wherein the connecting arm extends in the radial direction of the main body, the connecting part of the holding member is provided at an upper end of the connecting arm, and the hooking part of the holding member is arranged at a lower end of the connecting arm, wherein the holding member forms a "Z"-shaped structure.

2. The shower control valve of claim 1, wherein the water outlet channel comprises a shower channel and a rain shower channel, and the control member comprises a switching member, wherein the switching member controls the water inlet channel to switch communication with the shower channel and the rain shower channel.

3. The shower control valve of claim 1, wherein, the control member comprises a knob rotatably arranged at the first end of the main body.

4. The shower control valve of claim 1, wherein the holding member is an integrally formed structure, or the holding member comprises an insert block and an outer shell, and the insert block and the outer shell are formed by secondary rubberization.

5. A shower control valve with a reasonable arrangement, comprising a main body, a control member and a holding member, wherein the main body comprises a water inlet channel and a water outlet channel;

the control member is movably arranged at a first end of the main body and used to control an on-off of a water flow between the water inlet channel and the water outlet channel;

the holding member comprises a connecting part fixedly connected to a second end of the main body, and a hooking part for hooking a shower head;

wherein, the connecting part and the hooking part are staggered along a radial direction of the main body; and the shower control valve further comprises a clamping structure between the connecting part and the main body, wherein the connecting part and the main body are connected and limited along an axial direction of the main body by the clamping structure, wherein the connecting part is rotatable relative to a circumferential direction of the main body.

6. The shower control valve of claim 5, wherein the clamping structure comprises an inserting shaft fixedly arranged on the main body, and a sleeve fixedly installed on the connecting part, wherein the inserting shaft is inserted and connected to the sleeve.

7. The shower control valve of claim 6, wherein the inserting shaft comprises a clamping part, wherein the sleeve comprises a position-limiting member, wherein the clamping part and the position-limiting member are limited in the axial direction and rotate in the circumferential direction.

8. The shower control valve of claim 7, further comprising a ring chuck, wherein the ring chuck is in position-limiting fit with the sleeve in the circumferential direction, and a side of the ring chuck is provided with a plurality of clamping teeth along the circumferential direction, wherein the side of the ring chuck is opposite to the main body, and the ring chuck is provided with a central hole sleeved and fitted with the inserting shaft, the inserting shaft passes through the central hole and is clamped with the position-limiting member of the sleeve, wherein the ring chuck is pressed tightly against the main body.

9. The shower control valve of claim 8, wherein the holding member is an integrally formed structure, or the holding member comprises an insert block and an outer shell, and the insert block and the outer shell are formed by secondary rubberization.

10. The shower control valve of claim 7, wherein the holding member is an integrally formed structure, or the holding member comprises an insert block and an outer shell, and the insert block and the outer shell are formed by secondary rubberization.

11. The shower control valve of claim 7, wherein the water outlet channel comprises a shower channel and a rain shower channel, and the control member comprises a switching member, wherein the switching member controls the water inlet channel to switch communication with the shower channel and the rain shower channel.

12. The shower control valve of claim 6, wherein the sleeve is fixed on the connecting part by a fastener.

13. The shower control valve of claim 5, wherein the holding member is an integrally formed structure, or the holding member comprises an insert block and an outer shell, and the insert block and the outer shell are formed by secondary rubberization.

14. The shower control valve of claim 6, wherein the holding member is an integrally formed structure, or the holding member comprises an insert block and an outer shell, and the insert block and the outer shell are formed by secondary rubberization.

15. The shower control valve of claim 6, wherein the water outlet channel comprises a shower channel and a rain shower channel, and the control member comprises a switching member, wherein the switching member controls the water inlet channel to switch communication with the shower channel and the rain shower channel.

16. The shower control valve of claim 12, wherein the holding member is an integrally formed structure, or the holding member comprises an insert block and an outer shell, and the insert block and the outer shell are formed by secondary rubberization.

17. The shower control valve of claim 5, wherein the water outlet channel comprises a shower channel and a rain shower channel, and the control member comprises a switching member, wherein the switching member controls the water inlet channel to switch communication with the shower channel and the rain shower channel.

18. A shower control valve with a reasonable arrangement, comprising a main body, a control member and a holding member, wherein the main body comprises a water inlet channel and a water outlet channel;

the control member is movably arranged at a first end of the main body and used to control an on-off of a water flow between the water inlet channel and the water outlet channel;

the holding member comprises a connecting part fixedly connected to a second end of the main body, and a hooking part for hooking a shower head;

wherein, the connecting part and the hooking part are staggered along a radial direction of the main body; and the holding member is an integrally formed structure, or the holding member comprises an insert block and an outer shell, and the insert block and the outer shell are formed by secondary rubberization.

* * * * *